United States Patent [19]

Kiang

[11] Patent Number: 4,966,944
[45] Date of Patent: Oct. 30, 1990

[54] IMPACT PROPYLENE COPOLYMERS WITH IMPROVED BRUISE RESISTANCE

[75] Inventor: Webster W. Kiang, Lisle, Ill.

[73] Assignee: Quantum Chemical Corporation, Cincinnati, Ohio

[21] Appl. No.: 262,283

[22] Filed: Oct. 25, 1988

Related U.S. Application Data

[63] Continuation-in-part of Ser. No. 945,214, Dec. 10, 1986, abandoned, which is a continuation of Ser. No. 771,778, Sep. 3, 1985, abandoned.

[51] Int. Cl.$^5$ .................... C08L 23/26; C08L 23/10; C08L 23/16; C08L 23/20
[52] U.S. Cl. ........................... 525/88; 525/194; 525/222; 525/240; 525/80
[58] Field of Search .................. 525/240, 88, 194

[56] References Cited

U.S. PATENT DOCUMENTS

| | | | |
|---|---|---|---|
| 3,247,290 | 4/1966 | Werkman et al. | 260/897 |
| 3,478,128 | 11/1969 | Hagemeyer et al. | 525/88 |
| 3,629,368 | 12/1971 | Fukuda et al. | 525/322 |
| 4,078,020 | 3/1978 | Rose et al. | 525/240 |
| 4,140,732 | 2/1979 | Schnetger et al. | 525/88 |
| 4,161,574 | 7/1979 | Strametz et al. | 526/159 |
| 4,188,350 | 2/1980 | Vicik et al. | 525/240 |
| 4,256,784 | 3/1981 | Gebhardt et al. | 428/216 |
| 4,275,119 | 6/1981 | Weiner | 428/516 |
| 4,291,092 | 9/1981 | Weiner | 428/349 |
| 4,297,411 | 10/1981 | Weiner | 428/347 |
| 4,303,708 | 12/1981 | Gebhardt et al. | 428/35 |
| 4,316,970 | 2/1982 | Hughes | 525/240 |
| 4,339,496 | 7/1982 | Weiner | 428/349 |
| 4,375,531 | 3/1983 | Ross | 525/93 |
| 4,378,451 | 3/1983 | Edwards | 525/240 |
| 4,387,185 | 6/1983 | Schroeder et al. | 525/194 |
| 4,395,519 | 7/1983 | Minami et al. | 525/240 |
| 4,415,718 | 11/1983 | Miyoshi et al. | 526/348.6 |
| 4,666,989 | 5/1987 | McCullouch et al. | 525/240 |
| 4,727,112 | 2/1988 | Kohyama et al. | 525/194 |

FOREIGN PATENT DOCUMENTS 56-50940 10/1979 Japan.
1440659 6/1976 United Kingdom .................. 525/88

Primary Examiner—Carman J. Seccuro
Attorney, Agent, or Firm—Marshall, O'Toole, Gerstein, Murray & Bicknell

[57] ABSTRACT

A bruise-resistant, high impact polymeric blend that contains up to 40% by weight, of polybutene-1 or a random copolymer of butene-1 and up to 10 mole % of ethylene. A second component of the blend contains at least 60% by weight of a specified polypropylene-based material.

6 Claims, No Drawings

IMPACT PROPYLENE COPOLYMERS WITH IMPROVED BRUISE RESISTANCE

CROSS-REFERENCE TO RELATED APPLICATIONS

This is a continuation in-part of co-pending U.S. application Ser. No. 945,214, filed Dec. 10, 1986, now abandoned, which is a continuation of U.S. application Ser. No. 771,778, filed Sept. 3, 1985, now abandoned.

BACKGROUND OF THE INVENTION

1. Field of the Invention

The invention relates generally to polymeric blends having high impact strength and, more particularly, the invention relates to blends of thermoplastic polypropylenes and butene polymers, which exhibit improved resistance to stress whitening or bruising.

2. Description of Related Technology

Many applications incorporating polymeric materials, including batteries, furniture and vehicle parts, require high impact strength, stiffness, and toughness. Useful materials generally have unfilled flexural modulus values between 100,000 and 250,000 psi. However, impact polymers having the desired strength and stiffness typically suffer from cosmetic defects (such as discoloring) caused by external stresses, generally described as stress whitening. This stress whitening can result in cosmetic rejection of a finished product and in some applications the problem is significant. For example, in injection molding processes, the molded article is ejected from the mold using ejection pins. The removal process unavoidably stresses the product at the points of contact with the pins, resulting in cosmetically unacceptable discolorations.

SUMMARY OF THE INVENTION

It is an object of the invention to overcome one or more of the problems described above.

According to the invention, a high impact polymeric blend comprises a first component of a butene-1 homopolymer or a random copolymer of butene-1 and ethylene and a second component of primarily polypropylene.

The polymeric blends of the invention exhibit improved bruise resistance compared to other high impact polypropylene based materials, yet retain the desirable properties of high impact strength, stiffness, and toughness.

Other objects and advantages will be apparent to those skilled in the art from the following detailed description, taken in conjunction with the appended claims.

DETAILED DESCRIPTION OF THE INVENTION

The first component of the blend of the present invention is polybutene-1 homopolymer or a random copolymer of butene-1 and ethylene. Both are referred to generally herein as butene-1 polymers or "polybutene," and are crystalline thermoplastics. The copolymer may contain up to 10.0 mole percent ethylene. The polybutene component should be present in an amount between about five and forty weight percent of the polymeric blend in order to provide the desired resistance to bruise or stress whitening under impact. Generally, bruise resistance increases as the amount of the first component is increased. When the proportion of the first component increases above forty weight percent, the blend becomes uneconomical because of the higher price of the first component. However, any amount of the first component will improve stress whitening resistance. The blend should contain at least about five weight percent of the first component in order to provide a real commercial advantage; generally, no more than about twenty weight percent of polybutene is necessary.

The second component of the blend of the present invention is primarily polypropylene, but may contain polyethylene or other additional materials.

The second component of the blend of the present invention can be a reactor-made intimate mixture of polypropylene and randomly polymerized copolymers of propylene and ethylene. The reactor-made intimate mixtures of polypropylene and randomly polymerized copolymers of propylene and ethylene mentioned above are made by a multi-stage polymerization process wherein, in a first, stirred reaction vessel, gaseous propylene is contacted with a polymerization catalyst, preferably of the titanium-ester coordination complex type, and aluminum alkyl. In the second stage, propylene and ethylene are copolymerized in intimate admixture with the polymer formed in the first stage.

The second component of the blend of the present invention may also be a visbroken blend of reactor-made intimate mixtures polypropylene and random copolymers of propylene and ethylene and less than ten weight percent (based in the total weight of the visbroken blend) of an additional component selected from the group consisting of low density polyethylene, ethylene vinyl acetate copolymer, acrylate-modified polyethylene, high density polyethylene, ethylene-propylene rubber and blends thereof. The preferred component for blending in the visbroken blend is high density polyethylene because it is more economical. The visbroken blends and their method of preparation are described in detail in U.S. Pat. No. 4,375,531, which is hereby incorporated by reference.

The two components are blended together by an convenient method, but preferably in the upstream section of the same extruder used for visbreaking. The key feature is the blending of the components and the subsequent visbreaking to provide high impact properties in combination with a high melt flow index. Visbreaking is actually the controlled degradation of the polymers. There are two well-known methods of visbreaking. One is called chemical visbreaking and involves the use of a peroxide or other free radical initiator and the other merely involves the use of high temperatures and is called thermal visbreaking.

Alternatively, the second component of the blend of the present invention may be either block copolymers of propylene and ethylene or blends of polypropylene and random copolymers of propylene and ethylene prepared by synthesizing the two separately and then blending them together according to methods well known in the art.

The first component comprises between about five and forty weight percent of said polymeric blend; the second component comprises between about sixty and ninty-five weight percent of said polymeric blend and has flexural modulus between 100,000 and 275,000 psi. The polymer blend has a flexural modulus greater than 90,000 psi. (Flexural modulus is conventionally measured according to ASTM D-790-71, Method 1A). Preferred blends contain between about five and twenty-five percent by weight of the first component and the most preferred blends contain between about ten and twenty percent by weight of the first component. Preferred blends have the second component made of reactor-made intimate mixtures of polypropylene and random copolymers of propylene and ethylene or visbroken blends of reactor-made intimate mixtures of polypropylene and random coplymers of propylene and ethylene and less than ten percent by weight of an additional component selected from the group consisting of low density polyethylene, ethylene vinyl acetate copolymers, acrylate-modified polyethylene, high density polyethylene, ethylene-propylene rubber and blends thereof.

The primary material of the second component is mainly crystalline polypropylene. When the second component is a reactor made mixture of polypropylene and randomly polymerized copolymers of propylene and ethylene, the polymer is mainly crystalline with some non-crystalline amorphous non-elastomeric components. The crystalline polypropylene material can be blended with other materials using methods known in the art to generate polymers with desired characteristics. The second component contains at least sixty percent by weight polypropylene has a flexural modulus greater between 100,000 and 275,000 psi, and is used in a preparation selected to ensure the final polymeric blend has a flexural modulus greater than 90,000 psi and the desired impact strength and stiffness characteristics. Neither the first nor the second component has elastomeric properties, such as deformation or elastic recovery properties associated with elastomers known in the art. The polymeric blends of the invention are hard, inelastic and strong.

The two primary components of the present invention may be blended by any convenient method known in the art. An example of such a blending method is dry blending the components and then running them through an extruder with or without an appropriate amount of visbreaking initiator. Melt blending and co-extrusion may also be used.

In chemical visbreaking, the blend of the components is treated with from about 50 ppm to about 2,000 ppm of a free radical initiator such as peroxide, hyper-peroxide, azo or diazo compound, etc. at a temperature above the melting point of the polymeric materials used, usually from about 350° F to about 550° F. The temperature used must be above the melting point of polymer and high enough to decompose the initiator. The visbreaking process can take place in an extruder or compounding mixer of the Banbury, FCM, or other type. Good dispersion of the initiator is important. The process is continued until the desired increase in melt flow rate is obtained.

Thermal visbreaking or thermal degradation is carried out under somewhat different conditions. These are: temperatures in excess of 550° F. and the absence of free radical initiators and process of heat stabilizer additives.

EXAMPLE I

In this Example, a series of experiments were performed on a blend of copolymers of butene-1 and ethylene (1.5 mole percent ethylene) and a reactor-made intimate mixture of polypropylene and randomly polymerized copolymers of propylene. The copolymer of butene-1 and ethylene is Component A and the reactor-made intimate mixture is Component B. The components were blended and then the properties were determined according to standard tests. The results are shown in Table 1 below.

TABLE 1

| | Control | Sample 1 | Sample 2 | Sample 3 |
|---|---|---|---|---|
| Composition | | | | |
| Component A | 0 | 5 wt. % | 12.5 wt. % | 25 wt. % |
| Component B | 100 wt. % | 95 wt. % | 87.5 wt. % | 75 wt. % |
| Properties | | | | |
| Bruise Rating | 0.96 | 0.8 | 0.52 | 0.32 |
| ASTM D-3029-78 Procedure B Gardner Impact (in-lbs)($-18°$ C.) | 206 | 209 | 218 | 234 |
| ASTM D-790-71 Method 1A Flexural Modulus (psi) | 140M | 132M | 115M | 104M |
| ASTM D-256-78 Notched Izod (ft-lb/in)($23°$ C.) | 1.78 | 1.85 | 2.13 | 2.75 |
| ASTM D-256-78 Unnotched Izod (ft-lb/in) ($-18°$ C.) | 20.45 | 20.45 | 20.45 | 22.94 |

The bruise rating is determined by injection molding a color disk, impacting it with force of 20 in-lbs. and measuring the difference in color index between impacted disks and unimpacted sample disks using a photospectrometer. The numbers shown in the Tables are determined by dividing the color index difference between the impacted and unimpacted sample disks of the material to be evaluated by the difference in color index between the impacted and unimpacted sample disks of the reference sample which is considered typical of this type of resin. The bruise rating for the reference sample is defined as 1.00. For a given sample, the smaller the values mean better bruise resistance. The addition of the copolymers of butene-1 and ethylene to the reactor-made intimate mixture improves the bruise resistance of the original material without materially adversely affecting its impact strength.

EXAMPLE II

In this example, several experiments were carried out using a reactor-made intimate mixture of polypropylene and randomly polymerized copolymers of propylene and ethylene (Component A). This material was blended with two different kinds of butene-1 and ethylene random copolymers (1.5 mole percent ethylene), with a respective melt indexes of 2 and 4 (Components B and C, respectively). The blends were visbroken in an extruder at 500° F. with an appropriate amount of peroxide to adjust the final melt flow rate to the desired value. The properties of the different materials were determined as in Example I. The results are set out in Table 2.

TABLE 2

| | Control | Sample 1 | Sample 2 | Sample 3 | Sample 4 |
|---|---|---|---|---|---|
| Composition | | | | | |
| Component A | 100% | 95% | 87.5% | 75% | 87.5% |
| Component B (2 MI) | 0 | 5% | 12.5% | 25% | 0 |
| Component C (4 MI) | 0 | 0 | 0 | 0 | 12.5% |
| Properties | | | | | |
| Melt Flow Rate | 16.6 | 18.9 | 24.7 | 32.0 | 26.0 |

TABLE 2-continued

|  | Control | Sample 1 | Sample 2 | Sample 3 | Sample 4 |
|---|---|---|---|---|---|
| Bruise Rating | 1.00 | 0.86 | 0.63 | 0.37 | 0.60 |
| ASTM D-3029-78 Procedure B Gardner Impact (in-lbs)(−18° C.) | 207 | 118 | 127 | 99 | 100 |
| ASTM D-790-71 Method 1A Flexural Modulus (psi) | 114M | 103M | 93M | 84M | 91M |
| ASTM D-256-78 Notched Izod (ft-lb/in)(23° C.) | 1.79 | 1.89 | 2.3 | 2.3 | 2.0 |
| ASTM D-256-78 Unnotched Izod (ft-lb/in) (−18° C.) | 14.6 | 14.4 | 13.3 | 13.9 | 14.0 |

The addition of the copolymers of butene-1 and ethylene to the reactor-made intimate mixture improves the bruise resistance of the original material without materially affecting its impact strength.

EXAMPLE III

In this example, another series of experiments was performed using the reactor-made intimate mixture of polyethylene and randomly polymerized copolymers of propylene and ethylene (Competent B in this Example) used in Example II. This material was blended with homopolymer polybutene-1 (Component A) and extruded with various levels of peroxides to achieve various melt flow rates. The properties of the different materials were determined as in Example II. The results are set out in Table 3.

TABLE 3

| Composition | Control | Sample 1 | Sample 2 | Sample 3 |
|---|---|---|---|---|
| Component A | — | 10% | 10% | 10% |
| Component B | 100% | 90% | 90% | 90% |
| Visbreaking | No | Yes | Yes | Yes |
| MFR (g/10 min) | 1.8 | 1.8 | 5.5 | 19.4 |
| Bruise Rating | 1.09 | 0.61 | 0.91 | 0.74 |
| ASTM D-3029-78 Procedure B Gardner Impact (in-lbs)(−18° C.) | 240 | 240 | 240 | 240 |
| ASTM D-790-71 Method 1A Flexural Modulus (psi) | 147M | 129M | 100M | 93M |
| ASTM D-256-78 Notched Izod (ft-lb/in)(23° C.) | 3.3 | 3.9 | 3.1 | 2.3 |
| ASTM D-256-78 Unnotched Izod (ft-lb/in) (−18° C.) | 25.0 | 25.9 | 22.7 | 20.2 |

Again, addition of the polybutene-1 improves the bruise resistance of the polymer.

The foregoing detailed description is given for clearness of understanding only, no unnecessary limitations should be understood therefrom, and modifications within the scope of the invention will be apparent to those skilled in the art.

I claim:
1. A polymeric blend comprising:
    (a) 5 to 25 wt. % of a first component selected from the group consisting of polybutene-1 and random copolymers of butene-1 and ethylene containing up to 10 mole percent ethylene; and
    (b) 75 to 95 wt.% of a substantially elastomer-free second component selected from the group consisting of
        (i) reactor-made intimate mixtures of propylene homopolymer and random copolymers of propylene and ethylene;
        (ii) visbroken blends of reactor-made intimate mixtures of propylene homopolymer and random copolymers of propylene and ethylene, and less than 10 wt. % of said visbroken blend of an additional component selected from the group consisting of low density polyethylene, ethylene vinyl acetate copolymers, acrylate-modified polyethylene, high density polyethylene, and mixtures thereof;
        (iii) block copolymers of propylene and ethylene, and
        (iv) blends of propylene homopolymer and random copolymers of propylene and ethylene; wherein said second component has a flexural modulus between 100,000 and 275,000 psi and said polymeric blend has a flexural modulus greater than 90,000 psi.
2. A polymeric blend according to claim 1 wherein said first component comprises between about 10 and 20 wt. % of said polymeric blend.
3. A polymeric blend according to claim 1 wherein said second component is (b)(i).
4. A polymeric blend according to claim 1 wherein said second component is (b)(ii).
5. A polymeric blend according to claim 1 wherein said second component is (b)(iii).
6. A polymeric blend according to claim 1 wherein said second component is (b)(iv).

* * * * *